US010250540B2

(12) United States Patent
Tanurdjaja et al.

(10) Patent No.: US 10,250,540 B2
(45) Date of Patent: Apr. 2, 2019

(54) IDEA GENERATION PLATFORM FOR DISTRIBUTED WORK ENVIRONMENTS

(71) Applicant: Accenture Global Services Limited, Dublin (IE)

(72) Inventors: Stephen Tanurdjaja, Melbourne (AU);
Veena Kadayaprath, Rowville (AU);
Caitlin Duryea, Darlinghurst (AU);
Wai Kit Chong, Abbotsford (AU);
Daniel Vijayakumar, Lidcombe (AU);
Samantha Chan, Kellyville Ridge (AU)

(73) Assignee: Accenture Global Services Limited, Dublin (IE)

( * ) Notice: Subject to any disclaimer, the term of this patent is extended or adjusted under 35 U.S.C. 154(b) by 217 days.

(21) Appl. No.: 14/754,303

(22) Filed: Jun. 29, 2015

(65) Prior Publication Data

US 2016/0380941 A1    Dec. 29, 2016

(51) Int. Cl.
| | | |
|---|---|---|
| *H04L 9/32* | (2006.01) | |
| *G06Q 10/10* | (2012.01) | |
| *H04L 12/58* | (2006.01) | |
| *G06Q 10/06* | (2012.01) | |
| *G06Q 50/00* | (2012.01) | |

(52) U.S. Cl.
CPC ............ *H04L 51/16* (2013.01); *G06Q 10/10* (2013.01); *G06Q 10/103* (2013.01); *H04L 9/3271* (2013.01); *G06Q 10/06* (2013.01); *G06Q 50/01* (2013.01)

(58) Field of Classification Search
CPC ........ G06F 2221/2103; G06Q 20/4014; G06Q 50/01; G06Q 30/0201; G06Q 30/0203; H04L 63/08; H04L 51/16; H04L 9/32; H04L 51/046; H04L 51/32; H04L 67/22; H04L 41/22; H04L 43/028; H04L 51/04;
(Continued)

(56) References Cited

U.S. PATENT DOCUMENTS 8,769,417 B1 *   7/2014 Robinson .......... G06F 17/30867
                                                    715/708
9,208,692 B2 *  12/2015 Considine ................ G09B 7/02
(Continued)

FOREIGN PATENT DOCUMENTS

WO     WO 2015/039214      *  3/2015  ............. H01L 12/16

OTHER PUBLICATIONS

Australian Office Action for Application No. 2016204417, dated Apr. 4, 2017, 6 pages.
(Continued)

*Primary Examiner* — Sargon N Nano
(74) *Attorney, Agent, or Firm* — Fish & Richardson P.C.

(57) ABSTRACT

Methods, systems, and apparatus, including computer programs encoded on a computer storage medium, for displaying a challenge question in a challenge user interface displayed on a mobile device, displaying an idea user interface in response to user selection of the challenge question from the challenge user interface, receiving an idea based on user input to the idea user interface, the idea addressing subject matter of the challenge question, and transmitting an idea data set digitally representing the idea to a back-end system, the back-end system hosting an idea generation platform.

21 Claims, 7 Drawing Sheets
(5 of 7 Drawing Sheet(s) Filed in Color)

(58) Field of Classification Search
CPC .... H04L 51/02; H04L 29/06047; A63F 13/33; A63F 13/12; H04H 60/33
See application file for complete search history.

(56) References Cited

U.S. PATENT DOCUMENTS

| | | | | |
|---|---|---|---|---|
| 9,665,722 | B2* | 5/2017 | Nagasundaram | G06F 21/60 |
| 2005/0097070 | A1* | 5/2005 | Enis | G06N 99/005 |
| | | | | 706/50 |
| 2006/0089193 | A1* | 4/2006 | Buecheler | G07F 17/3239 |
| | | | | 463/23 |
| 2008/0222734 | A1* | 9/2008 | Redlich | G06F 21/577 |
| | | | | 726/26 |
| 2008/0294637 | A1 | 11/2008 | Liu | |
| 2009/0047928 | A1* | 2/2009 | Utsch | G06F 21/40 |
| | | | | 455/410 |
| 2009/0198565 | A1* | 8/2009 | Pluschkell, Jr. | G06Q 10/10 |
| | | | | 705/300 |
| 2010/0205025 | A1* | 8/2010 | Johansen | G06Q 10/101 |
| | | | | 705/300 |
| 2012/0088222 | A1* | 4/2012 | Considine | G09B 5/00 |
| | | | | 434/362 |
| 2012/0116982 | A1* | 5/2012 | Yoshida | G06Q 30/016 |
| | | | | 705/304 |
| 2012/0137351 | A1* | 5/2012 | Kiester | G06F 21/31 |
| | | | | 726/6 |
| 2013/0226999 | A1* | 8/2013 | Sarieddine | H04L 29/06047 |
| | | | | 709/203 |
| 2013/0239206 | A1* | 9/2013 | Draluk | G06F 21/00 |
| | | | | 726/19 |
| 2013/0262873 | A1* | 10/2013 | Read | H04W 12/06 |
| | | | | 713/186 |
| 2013/0316315 | A1* | 11/2013 | Song | G09B 7/00 |
| | | | | 434/238 |
| 2014/0189829 | A1* | 7/2014 | McLachlan | H04L 63/08 |
| | | | | 726/6 |
| 2014/0282979 | A1* | 9/2014 | Andon | H04L 63/0884 |
| | | | | 726/7 |
| 2015/0106216 | A1* | 4/2015 | Kenderov | G06Q 20/4014 |
| | | | | 705/21 |
| 2015/0227940 | A1 | 8/2015 | Brunet et al. | |
| 2015/0242850 | A1* | 8/2015 | Priebatsch | G06Q 20/40 |
| | | | | 705/64 |
| 2016/0057110 | A1* | 2/2016 | Li | G06F 21/31 |
| | | | | 726/7 |

OTHER PUBLICATIONS

Chan, S et al, "myIdeas by Sammie Chan on Prezi", [retrieved from internet on Aug. 24, 2016] <URL: https://prezi.com/9rxtbktwhesq/myideas/ > published on Jan. 22, 2015 as per the date on web page, 10 pages.
Australian Office Action for Application No. 2016204417, dated Aug. 26, 2016, 4 pages.
Australian Office Action for Application No. 2016204417, dated Aug. 15, 2017, 6 pages.
Australian Office Action for Application No. 2017219012, dated Nov. 30, 2018, 6 pages.

* cited by examiner

IDEA GENERATION PLATFORM FOR DISTRIBUTED WORK ENVIRONMENTS

BACKGROUND

Some enterprises include a distributed work environment, in which employees are separated by significant distances. For example, large business concerns can employ employees on different continents. In some work environments, employees may work from home and rarely, if ever, be in attendance at a facility (e.g., office building) of the enterprise.

In many instances, employees are hired to address problems of importance to the enterprise, and to create solutions to those problems. In distributed work environments, solution creation can be stunted as a result of less frequent direct interaction between employees, and/or reduced exposure to a broad audience of other employees within the enterprise. For example, although an employee may be assigned to one or more teams within an enterprise, the employee might not often directly interact with other team members. Further, the employee may interact even less often, if at all, with other employees that are not team members.

SUMMARY

Implementations of the present disclosure are directed to an idea generation platform for distributed work environments. More particularly, implementations of the present disclosure provide an idea generation platform including a plurality of devices that are connected over a network to create and distribute user data.

In some implementations, actions include displaying a challenge question in a challenge user interface displayed on a mobile device, displaying an idea user interface in response to user selection of the challenge question from the challenge user interface, receiving an idea based on user input to the idea user interface, the idea addressing subject matter of the challenge question, and transmitting an idea data set digitally representing the idea to a back-end system, the back-end system hosting an idea generation platform. Other implementations of this aspect include corresponding systems, apparatus, and computer programs, configured to perform the actions of the methods, encoded on computer storage devices.

These and other implementations can each optionally include one or more of the following features: the idea generation platform integrates the idea data set into a challenge question thread data set, which digitally represents ideas associated with the challenge question and user interactions with ideas; user interactions include a comment on an idea, an endorsement of an idea, and sharing of an idea; actions further include: receiving user credentials including enterprise-level credentials, transmitting the user credentials to an enterprise authentication service, and receiving authentication data, and at least partially in response to the authentication data, enabling a user to interact with the idea generation platform using the mobile computing device; actions further include: displaying a challenge submission user interface, receiving, through the challenge submission user interface, user input representing the challenge question, and transmitting a challenge question data set including the challenge question to the back-end system; the challenge question data set further include one or more of at least one keyword associated with the challenge question, at least one category assigned to the challenge question, and an expiration date associated with the challenge question; and the idea includes one or more of text and at least one image file.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 2A-2I depict example screenshots in accordance with implementations of the present disclosure.

Like reference symbols in the various drawings indicate like elements.

DETAILED DESCRIPTION

Implementations of the present disclosure are generally directed to an idea generation platform that enables multiple users to generate and contribute to ideas based on a challenge question. More particularly, implementations of the present disclosure provide an idea generation platform including a plurality of devices that are connected over a network to create and distribute user data. In some implementations, the user devices include a plurality of user devices and at least one server system. In some examples, each user device executes an application that enables a respective user to interact with other users through a computer-implemented service hosted by the at least one server system. In some implementations, and as described in detail herein, the idea generation platform issues challenge questions to users, to which one or more users can respond with an idea to address subject matter of the challenge question. For example, a user can submit a challenge question to the idea generation platform, which distributes the challenge question to one or more users. Accordingly, a challenge question functions as a catalyst for idea generation around particular subject matter. Users can comment on, share, endorse ideas, and/or can contribute additional ideas to address the subject matter of the challenge question and/or to address an idea submitted by another user. In this manner, one or more computer-generated idea threads, digitally captured in idea thread data sets, is provided for a challenge question. In some examples, each idea thread is provided as a computer-storable/-readable data set. The idea generation platform of the present disclosure provides multiple idea thread data sets that can be used for one or more applications (e.g., data mining).

Figure 1:
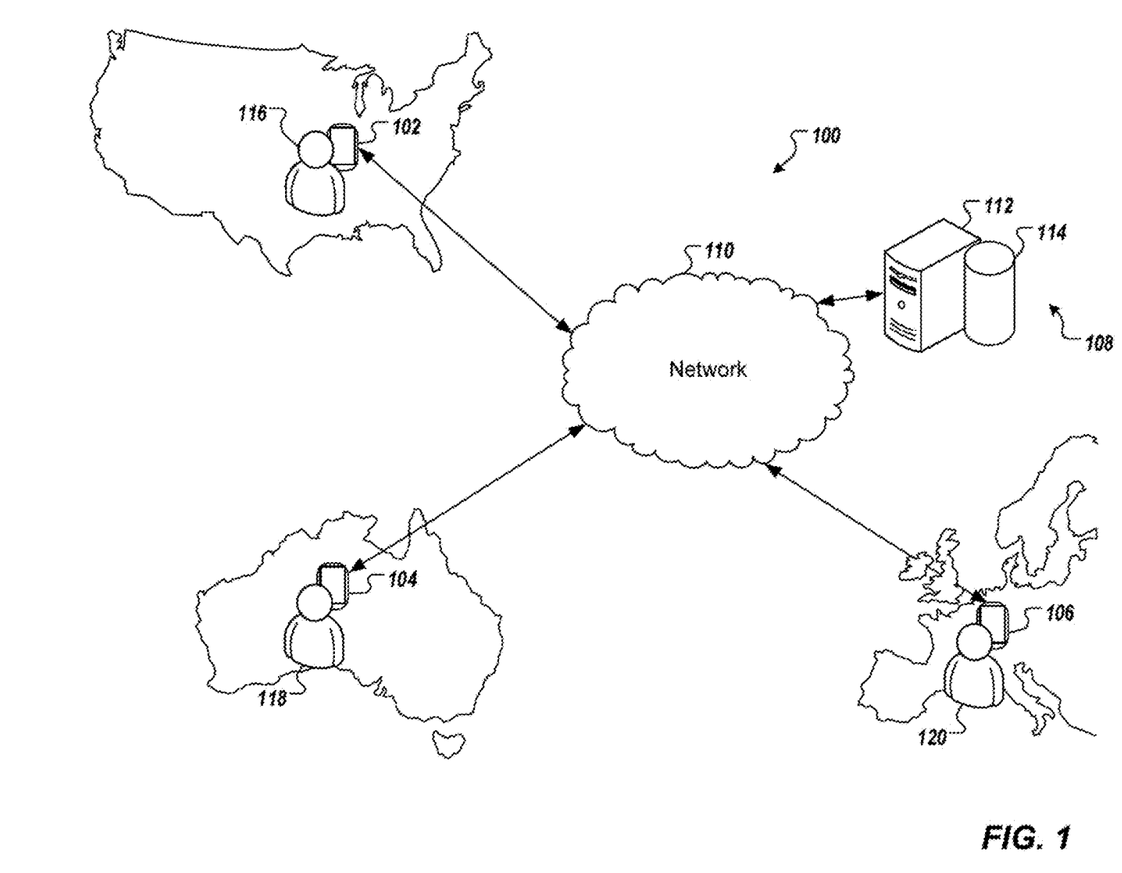
FIG. 1 depicts an example distributed work environment, in which implementations of the present disclosure can be realized.

FIG. 1 depicts an example distributed work environment 100, in which implementations of the present disclosure can be realized. The example system 100 includes a first computing device 102, a second computing device 104, a third computing device 106, a server system 108 and a network 110. The first, second and third computing devices 102, 104, 106 can each include any appropriate type of computing device such as a desktop computer, a laptop computer, a handheld computer, a tablet computing device, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. In the example system 100 of FIG. 1, the computing devices 102, 104, 106 are depicted as smartphones. Although three computing devices are depicted, implementations of the present disclosure can be realized using any number of at least two or more computing devices, and likely, hundreds of computing devices.

The computing devices 102, 104, 106 can communicate with one another and/or the server system 108 over the network 110. The network 110 can include a large computer network, such as a local area network (LAN), a wide area network (WAN), the Internet, a cellular network, or a combination thereof connecting any number of mobile computing devices, fixed computing devices and server systems. The server system 108 can include one or more computing devices 112 and one or more machine-readable repositories, or databases 114. Although a single server system is depicted, implementations of the present disclosure can be realized using any number of at least one or more server systems.

As introduced above, implementations of the present disclosure are generally directed to an idea generation platform that enables multiple users to generate and contribute to ideas based on a challenge question. More particularly, implementations of the present disclosure provide an idea generation platform including a plurality of devices that are connected over a network to create and distribute user data. For example, and with reference to FIG. 1, the computing devices 102, 104, 106 and the server system 108 can communicate with one another and distribute user data over the network 110. In some examples, each user device executes an application that enables a respective user to interact with other users through a computer-implemented service hosted by the at least one server system. For example, the computing devices 102, 104, 106 can each execute an application (e.g., mobile application, web browser) that enables respective users 116, 118, 120 to communicate user data to the server system 106 to interact with the idea generation platform.

The above-described example technological infrastructure is required for the idea generation platform of the present disclosure to exist. For example, enterprises (e.g., business concerns) employ users (e.g., employees) that are often in distributed location. For example, the example users 116, 118, 120 of FIG. 1 are located in the United States, Australia, and Europe, respectively. In some examples, users can be located within the same country, but in different cities. In some examples, users can be located in the same city, but in different facilities (e.g., office buildings) within the city. In some examples, users work from home offices, and otherwise may not be in regular attendance at a facility. In some examples, an enterprise can use a hoteling model, in which the enterprise provides office space on to employees on an as-needed basis rather than on a constantly reserved basis. For example, although a facility (e.g., office building) is provided, employees do not have a consistent, reserved location (e.g., office) within the facility.

Such distributed work environments have a disadvantage, in that, although users may be assigned to teams, and work with other users in the teams on a regular basis, users are not exposed to a larger audience of users within the enterprise. For example, a use may be in regular contact with and know users that are in the same team(s), but are not in contact with users outside of the team(s). Consequently, opportunities are lost to involve a broader audience of users in developing ideas and retaining knowledge within the enterprise. The idea generation platform of the present disclosure, which is enabled by the requisite underlying technological infrastructure, addresses these issues.

In some implementations, and as described in detail herein, the idea generation platform (e.g., hosted on the server system 106) issues challenge questions to users. In some implementations, and as described in further detail herein, a user can submit a challenge question to the idea generation platform, which distributes the challenge question to one or more users. For example, the users 116, 118, 120 can log into the idea generation platform using respective user credentials (e.g., username, password). In some examples, the idea generation platform is provided by an enterprise (e.g., a company) and restricts access to the idea generation platform to employees of the company, as described in further detail herein. In some examples, one or more challenge questions can be displayed to a user (e.g., on a respective computing device). For example, the server system 108 can transmit challenge data to the computing device, which challenge data includes a challenge question. In some example, the computing device processes the challenge data to display the challenge question on the computing device. In some implementations, the challenge data is included in a thread data set, portions of which, or all of which can be transmitted to the computing device to display idea information to the user.

In some implementations, a user can select a challenge question to provide an idea for and/or to review ideas submitted to other users. In some examples, a dialogue box is presented to the user in response to user-selection of a challenge question, through which the user can input an idea. In some examples, after the user has input the idea, idea data is transmitted from the computing device to the server system and is included in the idea thread data set corresponding to the challenge question.

In some implementations, one or more idea threads can be displayed to the user for a challenge question, each idea thread including an idea submitted by a user and any interactions of users with the idea thread. Example interactions can include comments, shares and endorsements. For example, users can comment on ideas of a challenge question and/or can comment on comments. In some examples, comment data is transmitted to the server system and is included in the idea thread data set for the particular idea. In another example, users can share an idea thread with one or more other users. For example, the user can select a share option and can identify one or more other users (e.g., by username), with which the idea thread is to be shared. In some examples, each of the identified users receives a notification (e.g., email, text message, push-notification), through which the users can initiate display of the idea thread. In some examples, share data is transmitted to the server system and is included in the idea thread data set for the particular idea. In another example, users can endorse (e.g., like) an idea and/or comment within an idea thread. For example, the user can select an endorsement option indicating that the user likes, or otherwise approves of the idea and/or comments. In some examples, endorsement data is transmitted to the server system and is included in the idea thread data set for the particular idea. Accordingly, one or more computer-generated idea threads can be provided for a challenge question. In some examples, each idea thread is provided as a computer-storable/-readable idea thread data set. The idea generation platform of the present disclosure provides multiple idea thread data sets that can be used for one or more applications (e.g., data mining).

FIGS. 2A-2I depict example screenshots in accordance with implementations of the present disclosure. The example screenshots of FIGS. 2A-2I depict screenshots of a mobile application of the idea generation platform, which mobile application can be executed on a computing device (e.g., computing devices 102, 104, 106 of FIG. 1).

Figure 2A:
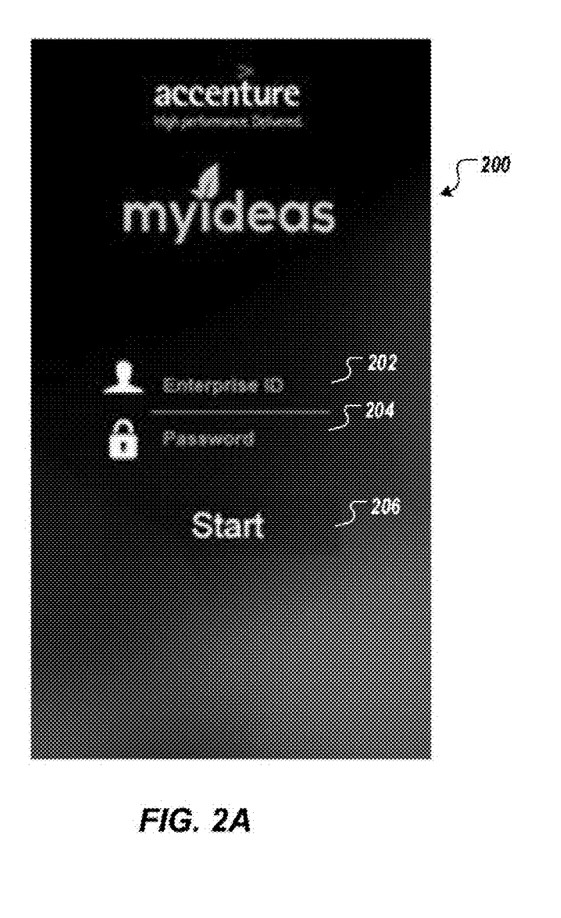

FIG. 2A depicts a log-in screen 200, through which a user can log into the idea generation platform (e.g., hosted on the server system 106 of FIG. 1). The example log-in screen includes dialog boxes 202, 204, into which the user can input user credentials (e.g., username, password). As noted above, the idea generation platform can be provided by an enterprise (e.g., company), where users of the idea generation platform include employees of the enterprise. In the depicted example, the enterprise includes Accenture. Accordingly, the user credentials can include the user's enterprise credentials (e.g., enterprise ID, which uniquely identifies the user within the enterprise, and password). In response to the user inputting credentials and selecting a start button 206, the user credentials are transmitted to the server system, which authenticates the user based on the user credentials. In some examples, if the user cannot be authenticated (e.g., incorrect username and password combination), an error message can be displayed to the user. In some examples, if the user can be authenticated (e.g., correct username and password combination), a landing screen of the idea generation platform is displayed.

In some examples, the user credentials are enterprise-level user credentials. That is, the user credentials are used by a respective user to authenticate the user to one or more computer-implemented systems operated by an enterprise. For example, the user credentials can include credentials used by an employee to log into computer-implemented systems of a company that employs the employee. In some examples, the use credentials are processed by an enterprise authentication service, which is independent of the idea generation platform, to authenticate the user. In this manner, enterprise-level security can be provided as part of the authentication process.

Figure 2B:
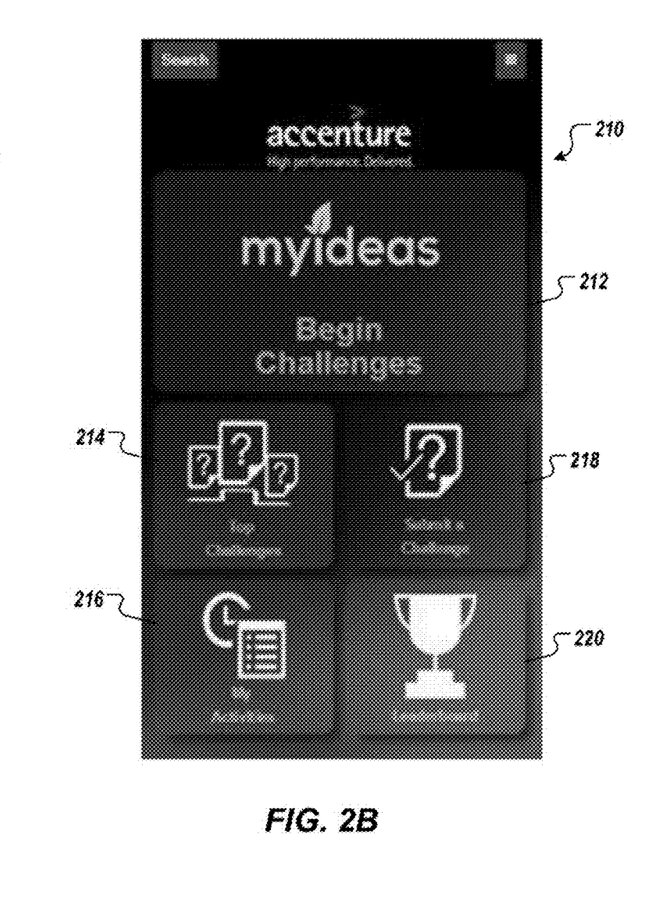

FIG. 2B depicts an example landing screen 210, which includes a option buttons 212, 214, 216, 218, 220 that the user can select to interact with the idea generation platform. In the depicted example, the option button 212 can be selected to begin challenges (e.g., answer a challenge question with an idea), the option button 214 can be selected to view top challenges (e.g., challenge questions having the most activity) within the idea generation platform, the option button 216 can be selected to view the user's activities (e.g., ideas, comments, shares, endorsements) within the idea generation platform, the option button 218 can be selected to submit a challenge question, and the option button 220 can be selected to view a leaderboard.

Figure 2C:
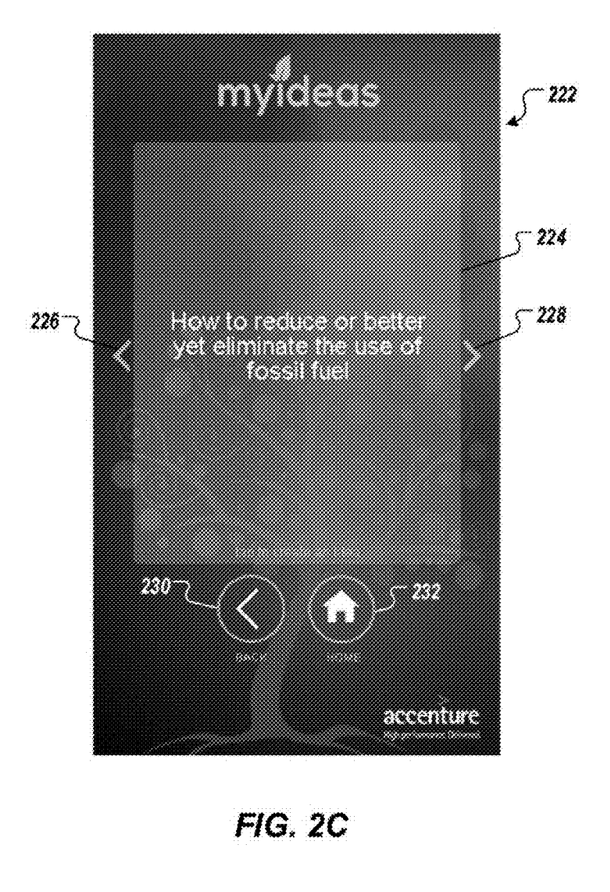

FIG. 2C depicts an example challenges screen 222. For example, the challenges screen 222 can be displayed in response to user selection of the option button 212 from the landing screen 210. The example challenges screen 222 includes a challenge display 224, scrolling buttons 226, 228, a back button 230, and a home button 232. In some examples, the challenge display 224 displays a challenge question (e.g., How to reduce or better yet eliminate the use of fossil fuel?). In some examples, the scrolling buttons 226, 228 enable the user to scroll through challenge questions, backward and forward, respectively. For example, in response to the user selecting the scrolling button 228, a different challenge question is displayed (e.g., What are the possible approaches to save energy on your devices?). If the user would like to submit an idea to address the subject matter of the challenge question, the user can select (e.g., tap on) the displayed challenge question. In response to the user selecting the scrolling button 226, the previous challenge question is again displayed. In response to user selection of the back button 230, a previously displayed screen can be displayed. For example, if the user was viewing the landing screen 210 immediately prior to the challenges screen 222, user selection of the back button 230 results in the landing screen 210 again being displayed. In response to user selection of the home button 232, the landing screen 210 is displayed.

Figure 2D:
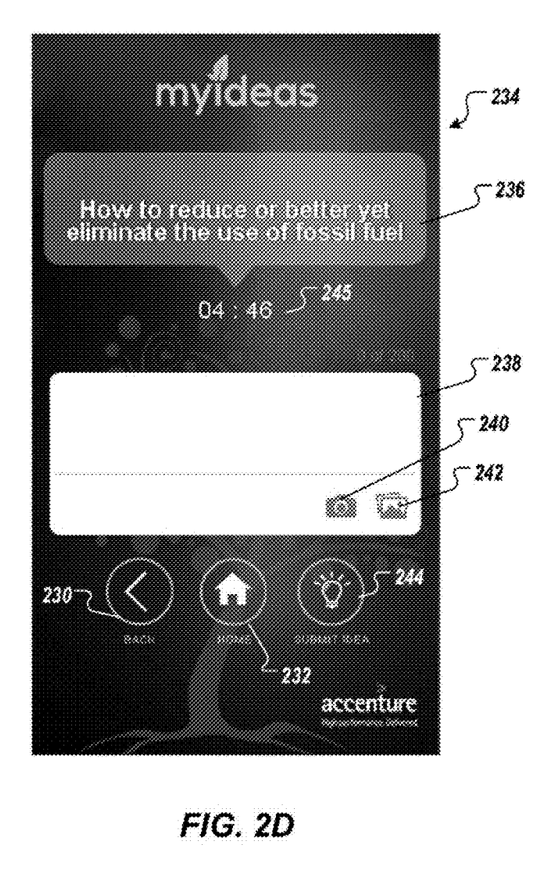

FIG. 2D depicts an idea screen 234. In some implementations, and as described in further detail herein, the user can submit an idea to address the subject matter of a challenge question using the idea screen 234. In some examples, the idea screen 234 is displayed in response to user selection of a challenge question from the challenges screen 222. In the depicted example, the idea screen 234 includes a challenge display 236, a dialog box 238, a camera icon 240, an images icon 242, a submit idea button 244, the back button 230, and the home button 232. The challenge display 236 displays the challenge question that the user selected from the challenges screen 222. The dialog box 238 enables the user to input text to define the idea that the user is submitting to address the subject matter of the challenge question. For example, the user can type the idea using a keyboard (not shown) displayed on the computing device.

In some examples, the user can select the camera icon 240 to capture an image using a camera of the computing device as part of the submission of the idea. For example, in response to user selection of the camera icon 240, the camera of the computing device can be activated, a camera screen, or viewfinder, (not shown) can be displayed, and the user can capture an image. In response, an image file can be created, which stores image data, the image file being associated with the idea that is to be submitted. In some examples, the user can select the images icon 242 to associate an image as part of the submission of the idea. For example, in response to user selection of the images icon 242, a camera roll (not shown) of existing images (e.g., images stored in respective image files on the computing device) can be displayed, and the user can select one or more images to be associated with the idea that is to be submitted.

Once the user has typed in the idea into the dialog box 238 and associated any images, the user can select the submit idea button 244 to submit the idea to the idea generation platform. In some implementations, in response to user selection of the submit idea button 244, an idea data set is defined, which includes the idea text and any image files associated with the idea. The idea data set is associated to the challenge question. For example, the challenge question can include a unique identifier that uniquely identifies the particular challenge question among a plurality of challenge questions. In some examples, the idea data set can include the unique identifier of the challenge question. In some implementations, the idea data set is transmitted to the back-end system that hosts the idea generation platform. In some examples, the idea data set is integrated into an idea thread data set, if any, for the particular challenge question. In some examples, if an idea thread data set already exists for the challenge question (e.g., one or more ideas have already been submitted), the idea data set is appended to the idea thread data set. In some examples, if an idea thread data set does not already exist for the challenge question (e.g., no ideas have already been submitted), an idea thread data set is instantiated, and the idea data set is stored therein.

In some implementations, the user is given a deadline for submitting an idea. For example, in response to selection of a challenge question, the idea screen 234 is displayed and includes a countdown clock 245. In some examples, the countdown clock 245 provides a predefined amount of time (e.g., 5 minutes) that the user has to submit the idea. In some examples, upon expiration of the predefined amount of time, the idea is automatically submitted to the back-end system.

Figure 2E:
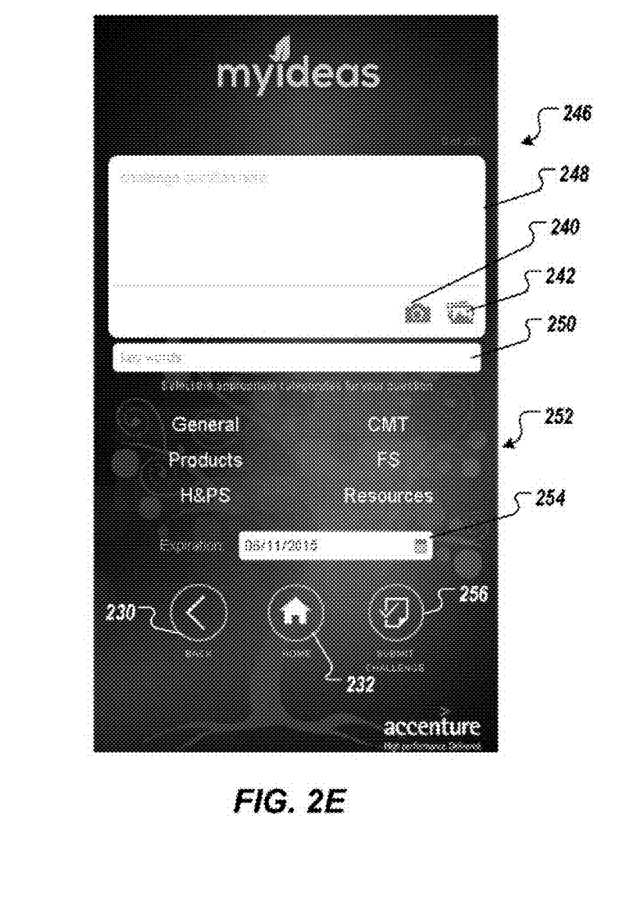

FIG. 2E depicts a challenge submission screen 246. In some implementations, and as described herein, the user can submit a challenge question for distribution through the idea generation platform through the challenge submission screen 246. In some examples, the challenge submission screen 246 is displayed in response to user selection of the option button 218 from the landing screen 210. In the depicted example, the challenge submission screen 246 includes a dialog box 248, the camera icon 240, the images icon 242, a keyword dialog box 250, categories 252, an expiration option 254, a submit challenge button 256, the back button 230, and the home button 232.

The user can input a challenge question (e.g., How to reduce or better yet eliminate the use of fossil fuel?, What are the possible approaches to save energy on your devices?) into the dialog box 248. For example, a keyboard can be displayed, which the user can use to type text into the dialog box 248. In some examples, the user can select the camera icon 240 to capture an image using a camera of the computing device as part of the submission of the challenge question. For example, in response to user selection of the camera icon 240, the camera of the computing device can be activated, a camera screen, or viewfinder, (not shown) can be displayed, and the user can capture an image. In response, an image file can be created, which stores image data, the image file being associated with the challenge question that is to be submitted. In some examples, the user can select the images icon 242 to associate an image as part of the submission of the challenge question. For example, in response to user selection of the images icon 242, a camera roll (not shown) of existing images (e.g., images stored in respective image files on the computing device) can be displayed, and the user can select one or more images to be associated with the challenge question that is to be submitted.

In some implementations, the user can associate the challenge question with one or more keywords. For example, the user can input one or more keywords into the keyword dialog box 250. In the case of multiple keywords, keywords can be separated by a space and/or comma. In some implementations, the keywords are associated with the challenge question. In some examples, the keywords can be used in an index of challenge questions, to enable users to search for challenge questions. In some implementations, the user can associate the challenge question with one or more categories. For example, the user can select one or more categories from the categories 252. In some implementations, the categories are associated with the challenge question. In some examples, the categories can be used in an index of challenge questions, to enable users to search for and/or filter challenge questions.

In some implementations, the user can select an expiration date for the challenge question. In some examples, the challenge question remains viewable for users to submit ideas to until the expiration date. For example, the user can indicate the expiration date using the expiration option 254. In some examples, in response to user input to the expiration option 254, a calendar can be displayed, from which the user can select the expiration date.

After the user has provided relevant information (e.g., the challenge question, keyword(s), categor(y/ies), expiration date), the user can submit the challenge question to the idea generation platform. For example, in response to user selection of the submit challenge button 256, a challenge question data set can be transmitted from the computing device to the back-end system. In some examples, the challenge data set includes the challenge question, any images associated with the challenge question, any keywords associated with the challenge question, any categories associated with the challenge question, and any expiration date associated with the challenge question. In some examples, the idea generation platform assigns a unique identifier to the challenge question data set, which uniquely identifies the challenge question and the associated data among a plurality of challenge question data sets.

Figure 2F:
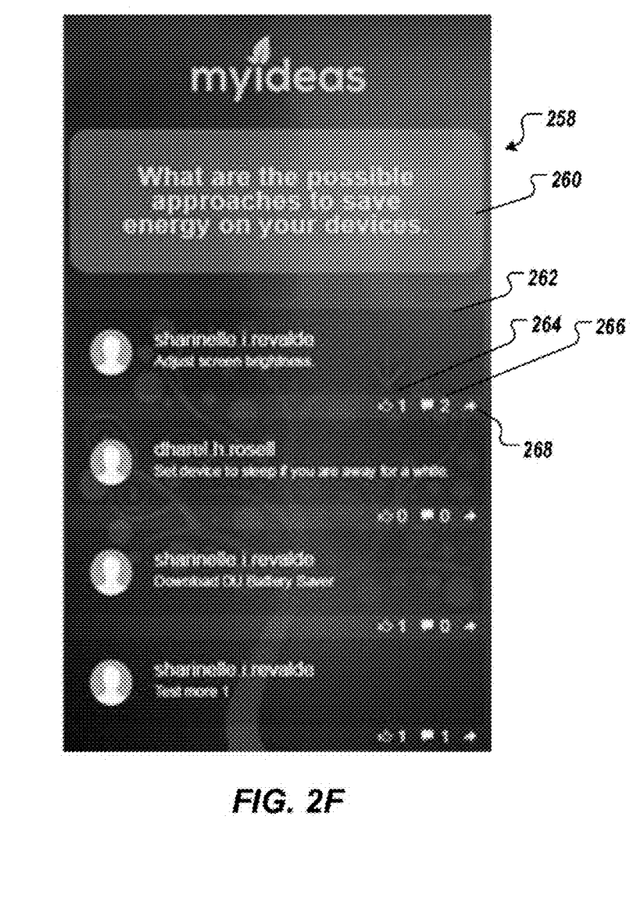

FIG. 2F depicts an example challenge question thread screen 258. In the depicted example, the challenge question thread screen 258 is based on the example challenge question 'What are the possible approaches to save energy on your devices?,' previously submitted by a user. The challenge question thread screen includes one or more ideas 262, which include ideas submitted by users in response to the challenge question. In some examples, each idea 262 includes an endorsement icon 264, a comment icon 266, and a share icon 268. In some examples, the endorsement icon 264 and the comment icon 266 include respective counts, indicating a number of endorsements and comments, respectively, of the idea 262. In the depicted example, the idea 'Adjust screen brightness' has one endorsement and two comments associated therewith. In some examples, the user can select an icon 264, 266, 268 to endorse, comment on, or share the idea 262.

Figure 2G:
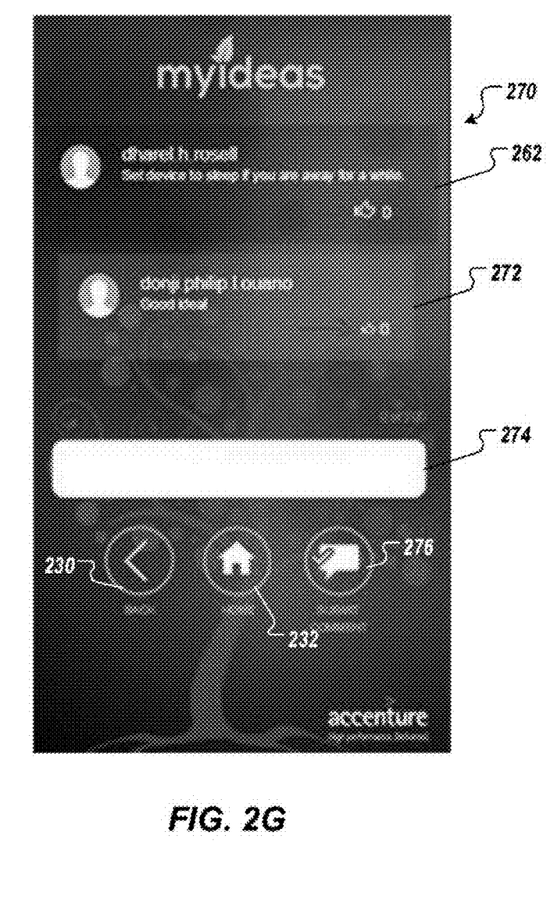

FIG. 2G depicts an example thread screen 270. In some implementations, the thread screen 270 is displayed in response to user selection of an idea 262 or the comment icon 266 for the idea 262. For example, user selection of the idea 262 from the challenge question thread screen 258 results in the thread screen 270 of FIG. 2G being displayed. The thread screen 270 displays the thread for a particular idea 262, the thread including one or more comments 272. In the depicted example, the thread is for the idea 'Set device to sleep if you are away for a while' and includes the comment 'Good idea!'. In some examples, icons such as the endorsement icon 264, and the share icon 266 can be displayed. In the depicted example, the thread screen 270 further includes a dialog box 274, a submit button 276, the back button 230, and the home button 232. In some examples, the user can type a comment into the dialog box 274 to contribute to the thread. The user can select (e.g., tap on) the submit button 276 to submit the comment to the idea generation platform (e.g., transmit comment data to the back-end system). In some examples, the idea generation platform appends the comment data to the thread data set of the respective idea.

Implementations of the present disclosure further provide gamification to encourage users to interact with the idea generation platform. In some examples, user activity is tracked and a score is determined for each user based on the user activity. Example user activities include submission of a challenge question, submission of an idea to a challenge question, commenting on an idea, sharing an idea, and endorsing an idea. In some examples, a sub-score can be provided for a respective activity, and a total score can be determined based on a plurality of sub-scores. In some examples, one or more sub-scores can be weighted, such that a sub-score influences the total score differently than other sub-scores. For example, submission of an idea to a challenge question can be weighted using a first weight, and endorsement of an idea can be weighted using a second weight, the second weight be less than the first weight. In this manner, submitting an idea influences the total score more than endorsing an idea.

Figure 2H:
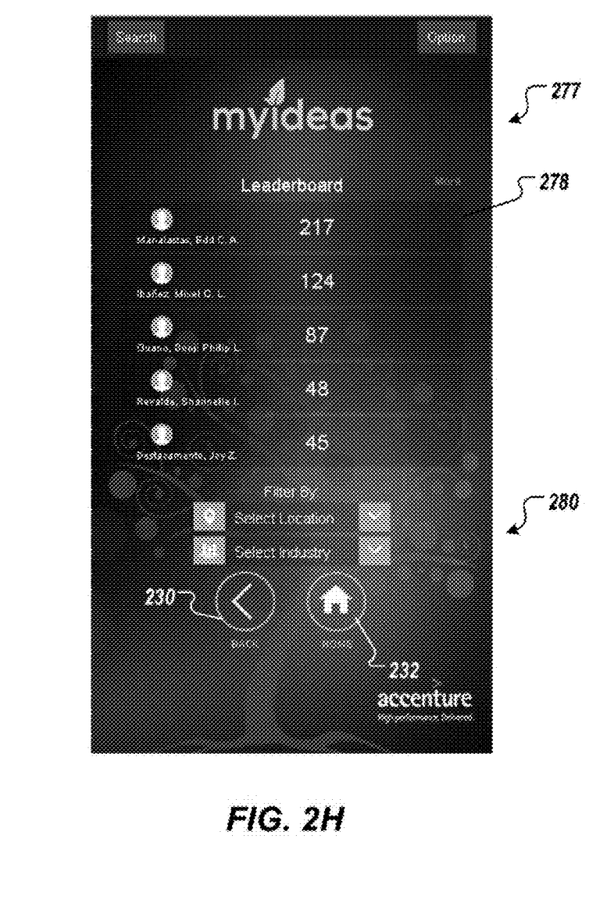

FIG. 2H depicts a leaderboard screen 277. In some examples, the leaderboard screen 270 can be displayed in response to user selection of the option button 220 from the landing screen 210 (see FIG. 2B). In some implementations, the leaderboard screen 277 provides a summary of the top X users based on respective total scores for the users, where X is an integer that is greater than 1 (e.g., X=5). In some examples, the users are ranked based on respective total scores and the top X users are selected for display on the leaderboard screen 278. In some examples, the leaderboard screen 277 includes user summaries 278, one or more filters 280, the back button 230, and the home button 232. In the depicted example, the user summary 278 includes a thumbnail image, the user's name, and the user's score. In the depicted example, the filters include a location filter and an industry filter. In some examples, the user can select a filter, and a drop-down menu is displayed, which provides two or more selections for the user to select from. For example, in response to user selection of the location filter, two or more locations (e.g., Australia, Europe, United States) can be displayed, and the user can select a location. In response to user selection of the location, user summaries are displayed for users that are associated with the selected location. As another example, in response to user selection of the industry filter, two or more industries can be displayed, and the user can select an industry. In response to user selection of the industry, user summaries are displayed for users that are associated with the selected industry. In some examples, users can be filtered on more than one filter selection at the same time.

FIG. 2I depicts a detailed summary screen 290. In some examples, the detailed summary screen 290 is displayed in response to user selection of a particular user from the leaderboard screen 277. The detailed summary screen 290 includes a detailed summary 292, the back button 230, and the home button 232. In the depicted example, the detailed summary 292 includes the thumbnail image, the user name, the user's total score, a count of the number of challenges submitted by the user, a count of the number of ideas submitted by the user, a count of the number of comments submitted by the user, a count of the number of times the user has endorsed ideas, and a count of the number of times the user has endorsed comments to ideas.

Figure 3:
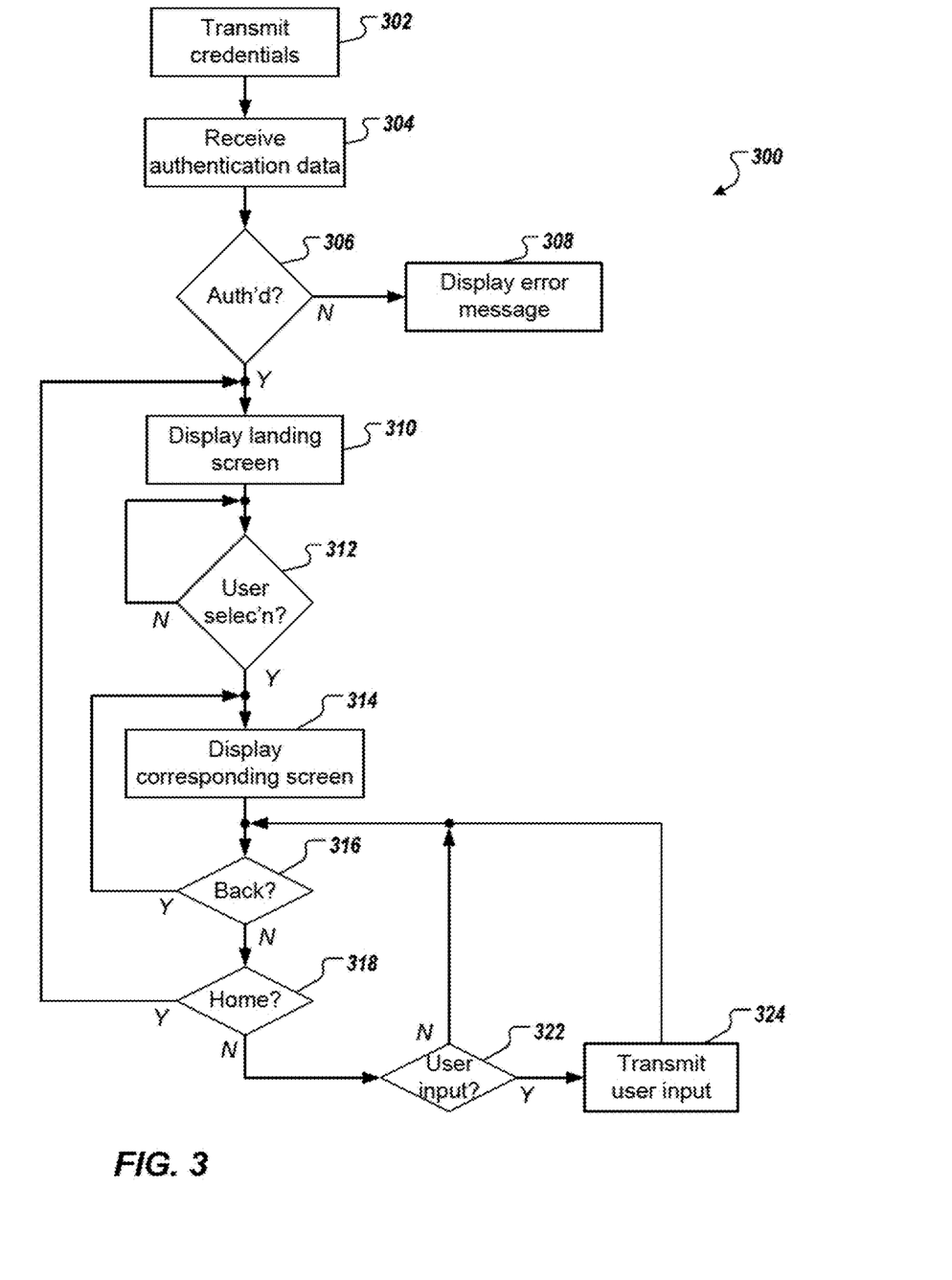
FIG. 3 depicts an example process that can be executed in implementations of the present disclosure.

FIG. 3 depicts an example process 300 that can be executed in implementations of the present disclosure. In some examples, the example process 300 is provided by one or more computer-executable programs that are executed using one or more computing devices. For example, the example process 300 is provided by a mobile application that is downloaded to and installed on a mobile computing device (e.g., a smartphone), and that enables a user to interact with the idea generation platform of the present disclosure.

User credentials are transmitted (302). For example, a user inputs user credentials (e.g., username, password) to a log-in screen (e.g., the log-in screen 200 of FIG. 2A). The user credentials are transmitted to a back-end system, which processes the user credentials in an effort to authenticate the user. In some examples, the back-end system provides authentication data that indicates whether the user is authentic. Authentication data is received (304). For example, the mobile computing device receives authentication data from the back-end system. It is determined whether the user has been authenticated (306). For example, the mobile computing device processes the authentication data to determine whether the user was authenticated by the back-end system. If the user was not authenticated, an error message is displayed (308). If the user was authenticated, a landing screen is displayed (310). For example, the landing screen 210 of FIG. 2B is displayed. It is determined whether a user selection has been made (312). If a user selection has not been made, the example process 300 idles.

If a user selection has been made, a corresponding screen is displayed (324). For example, if the user selects the option button 212, the challenges screen 222 is displayed, if the user selects the option button 214, a top challenges screen is displayed (e.g., showing challenge questions having the most activity within the idea generation platform), if the user selects the option button 216, a user activity screen is displayed to provide the user's activities (e.g., ideas, comments, shares, endorsements) within the idea generation platform, if use selects the option button 218, the challenge submission screen 246 is displayed, and if the user selects the option button 220, the leaderboard screen 277 is displayed.

It is determined whether the user has selected the back button 230. If the user has selected the back button 230, the previous screen is displayed. If the user has not selected the back button 230, it is determined whether the user has selected the home button 232. If the user has selected the home button 232, the landing screen is displayed (310). If the user has not selected the home button 232, it is determined whether user input has been received (322). For example, user input can be provided, which includes an idea to a challenge question, as described above with reference to FIG. 2D. As another example, user input can be provided, which includes submission of a challenge question, as described above with reference to FIG. 2E. As another example, user input can be provided, which includes interaction with (e.g., endorsement of, comment on, sharing of) an idea to a challenge question, as described above with reference to FIGS. 2F and 2G. As another example, user input can be provided, which includes one or more filters to be applied to the leaderboard, as described above with reference to FIG. 2H. If user input has been received, the user input is transmitted to the back-end system (324). For example, and as described in detail above, a data set is transmitted to the idea generation platform hosted on the back-end system. The example process 300 loops back.

Implementations of the idea generation platform of the present disclosure provide one or more of the following example technical advantages. For example, the idea generation platform enables ideas to be captured as computer-storable data, which can be subsequently mined using, for example, data analytics engines. As another example, implementations of the present disclosure enable users of an enterprise to work together to generate ideas (e.g., crowd-sourcing idea generation around challenge questions). For example, employees of an enterprise may work in remote locations (e.g., different continents) and/or work outside of an office. Consequently, the underlying technological infrastructure of computing devices, networks, and server systems, such as those described above with reference to the example distributed work environment 100 of FIG. 1, is required to implement the idea generation platform of the present disclosure. That is, the idea generation platform of the present disclosure cannot be divorced from the underlying technological infrastructure, as the idea generation platform could not exist without the underlying technological infrastructure. In other words, the idea generation platform is fundamentally rooted in technology to provide the idea generation functionality described herein.

Ideas can be spontaneous, and if no channel is available to immediately capture the idea, the idea can be lost. For example, a user may see a challenge question at a first time, may think about the challenge question, then have an idea to address the challenge question at a second time, which is later than the first time. If the user is not able to immediately record the idea (e.g., within a few minutes of the second time), the idea may be lost (e.g., the user forgets what the idea was). Because users interact with the idea generation platform through a mobile application executing on mobile computing devices, such as smartphones, users are able to immediately capture the idea by submitting the idea through the mobile application, and the idea is preserved as digital data.

Implementations of the present disclosure further enable enterprises to capture and record ideas generated by its employees. In some examples, enterprises provide a formal idea submission process for employees to submit ideas for possible protection (e.g., patent protection). Such processes require an independent workflow for the employee to execute, which can result in delays (e.g., the employee procrastinating in filling out the appropriate forms). In some examples, employees might not recognize the value an idea may have, and may forgo submitting the idea through an idea submission process. Accordingly, implementations of the present disclosure capture and digitally record ideas contemporaneously with conception of the ideas. Further, the employee that submitted the idea is identifiable enabling subsequent follow-up on the idea, and identification of possible inventor(s).

Further, the idea generation platform of the present disclosure provides a centralized channel for maintaining challenges and ideas across the distributed work environment. In some examples, a data analytics engine can be used to provide insights into how people use the idea generation platform, when they use it, what they use it for, and how long user use it per day. In some examples, gamification features described herein encourage entrepreneurial and competitive spirit within the enterprise with transparent scoring available for everyone within the enterprise to see. In some implementations, additional gamification features can be provided as more data is available from the data analytics engine. For example, if a certain location (e.g., Melbourne, Australia) has relatively low participants, the scoring can be adjusted to put more weight on the contributions from that location as an incentive to submit ideas to and interact with the idea generation platform.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method executed by one or more processors of a back-end system and comprising:
    providing, by the one or more processors, a challenge user interface that is presented on a first computing device to access an idea generation platform hosted by the back-end system, the challenge user interface presenting a challenge question that is submitted to the idea generation platform using the challenge user interface presented on a second computing device;
    providing, by the one or more processors, an idea user interface that is presented on the first computing device to access the idea generation platform, the idea user interface being presented in response to user selection of the challenge question from the challenge user interface;
    receiving, by the one or more processors, an idea that is transmitted to the back-end system from the first computing device, the idea having been input to the idea user interface to address subject matter of the challenge question;
    determining, by the one or more processors, a score for each of a plurality of users of the idea generation platform, the score for a user being a total score of a challenge question sub-score and an idea sub-score, wherein the challenge question sub-score is based on a number of challenge questions submitted by the user through the idea generation platform, wherein the idea sub-score is based on a number of ideas submitted by the user through the idea generation platform, wherein the challenge question sub-score has a first weight in the total score, and wherein the idea sub-score has a second weight in the total score that is different from the first weight; and
    adjusting, by the one or more processors, the score for at least one user of the plurality of users, the adjusting based on a previous level of participation in the idea generation platform by users whose location is that of the at least one user.

2. The method of claim 1, wherein the idea generation platform integrates an idea data set associated with the idea, into a challenge question thread data set, which digitally represents ideas associated with the challenge question and user interactions with ideas.

3. The method of claim 1, wherein user interactions comprise a comment on an idea, an endorsement of an idea, and sharing of an idea.

4. The method of claim 1, further comprising:
receiving, by the one or more processors, user credentials comprising enterprise-level credentials;
transmitting, by the one or more processors, the user credentials to an enterprise authentication service; and
receiving, by the one or more processors, authentication data, and at least partially in response to the authentication data, enabling a user to interact with the idea generation platform using a mobile computing device.

5. The method of claim 1, further comprising:
providing, by the one or more processors, a challenge submission user interface that is presented on the second computing device in response to selection of an option, on the challenge user interface, to submit the challenge question; and
receiving, by the one or more processors, the challenge question that is transmitted to the back-end system from the second computing device, the challenge question having been input through the challenge submission user interface.

6. The method of claim 5, wherein a challenge question data set associated with the challenge question further comprises one or more of at least one keyword associated with the challenge question, at least one category assigned to the challenge question, and an expiration date associated with the challenge question.

7. The method of claim 1, wherein the idea comprises one or more of text and at least one image file.

8. A non-transitory computer-readable storage medium coupled to one or more processors and having instructions stored thereon which, when executed by the one or more processors, cause the one or more processors to perform operations comprising:
providing a challenge user interface that is presented on a first computing device to access an idea generation platform hosted by a back-end system, the challenge user interface presenting a challenge question that is submitted to the idea generation platform using the challenge user interface presented on a second computing device;
providing an idea user interface that is presented on the first computing device to access the idea generation platform, the idea user interface being presented in response to user selection of the challenge question from the challenge user interface;
receiving an idea that is transmitted to the back-end system from the first computing device, the idea having been input to the idea user interface to address subject matter of the challenge question;
determining a score for each of a plurality of users of the idea generation platform, the score for a user being a total score of a challenge question sub-score and an idea sub-score, wherein the challenge question sub-score is based on a number of challenge questions submitted by the user through the idea generation platform, wherein the idea sub-score is based on a number of ideas submitted by the user through the idea generation platform, wherein the challenge question sub-score has a first weight in the total score, and wherein the idea sub-score has a second weight in the total score that is different from the first weight; and adjusting the score for at least one user of the plurality of users, the adjusting based on a previous level of participation in the idea generation platform by users whose location is that of the at least one user.

9. The computer-readable storage medium of claim 8, wherein the idea generation platform integrates an idea data set associated wit the idea, into a challenge question thread data set, which digitally represents ideas associated with the challenge question and user interactions with ideas.

10. The computer-readable storage medium of claim 8, wherein user interactions comprise a comment on an idea, an endorsement of an idea, and sharing of an idea.

11. The computer-readable storage medium of claim 8, wherein operations further comprise:
receiving user credentials comprising enterprise-level credentials;
transmitting the user credentials to an enterprise authentication service; and
receiving authentication data, and at least partially in response to the authentication data, enabling a user to interact with the idea generation platform using a mobile computing device.

12. The computer-readable storage medium of claim 8, wherein operations further comprise:
providing a challenge submission user interface that is presented on the second computing device in response to selection of an option, on the challenge user interface, to submit the challenge question; and
receiving the challenge question that is transmitted to the back-end system from the second computing device, the challenge question having been input through the challenge submission user interface.

13. The computer-readable storage medium of claim 12, wherein a challenge question data set associated with the challenge question further comprises one or more of at least one keyword associated with the challenge question, at least one category assigned to the challenge question, and an expiration date associated with the challenge question.

14. The computer-readable storage medium of claim 8, wherein the idea comprises one or more of text and at least one image file.

15. A system, comprising:
at least one computing device; and
a computer-readable storage device coupled to the at least one computing device and having instructions stored thereon which, when executed by the at least one computing device, cause the at least one computing device to perform operations comprising:
providing a challenge user interface that is presented on a first computing device to access an idea generation platform hosted by the system, the challenge user interface presenting a challenge question that is submitted to the idea generation platform using the challenge user interface presented on a second computing device;
providing an idea user interface that is presented on the first computing device to access the idea generation platform, the idea user interface being presented in response to user selection of the challenge question from the challenge user interface;
receiving an idea that is transmitted to the system from the first computing device, the idea having been input to the idea user interface to address subject matter of the challenge question;
determining a score for each of a plurality of users of the idea generation platform, the score for a user being a total score of a challenge question sub-score and an idea sub-score, wherein the challenge question sub-score is based on a number of challenge questions submitted by the user through the idea generation platform, wherein the idea sub-score is based on a number of ideas submitted by the user through the idea generation platform, wherein the challenge question sub-score has a first weight in the total score, and wherein the idea sub-score has a second weight in the total score that is different from the first weight; and adjusting the score for at least one user of the plurality of users, the adjusting based on a previous level of participation in the idea generation platform by users whose location is that of the at least one user.

16. The system of claim 15, wherein the idea generation platform integrates an idea data set associated with the idea, into a challenge question thread data set, which digitally represents ideas associated with the challenge question and user interactions with ideas.

17. The system of claim 15, wherein user interactions comprise a comment on an idea, an endorsement of an idea, and sharing of an idea.

18. The system of claim 15, wherein operations further comprise:

receiving user credentials comprising enterprise-level credentials;

transmitting the user credentials to an enterprise authentication service; and receiving authentication data, and at least partially in response to the authentication data, enabling a user to interact with the idea generation platform using a mobile computing device.

19. The system of claim 15, wherein operations further comprise:

providing a challenge submission user interface that is presented on the second computing device in response to selection of an option, on the challenge user interface, to submit the challenge question; and receiving the challenge question that is transmitted to the system from the second computing device, the challenge question having been input through the challenge submission user interface.

20. The system of claim 19, wherein a challenge question data set associated with the challenge question further comprises one or more of at least one keyword associated with the challenge question, at least one category assigned to the challenge question, and an expiration date associated with the challenge question.

21. The system of claim 19, wherein the idea comprises one or more of text and at least one image file.

* * * * *

UNITED STATES PATENT AND TRADEMARK OFFICE
CERTIFICATE OF CORRECTION

PATENT NO.        : 10,250,540 B2                                   Page 1 of 1
APPLICATION NO.   : 14/754303
DATED             : April 2, 2019
INVENTOR(S)       : Tanurdjaja et al.

It is certified that error appears in the above-identified patent and that said Letters Patent is hereby corrected as shown below:

In the Claims

Column 16, Line 7, Claim 9, delete "wit" and insert -- with --, therefor.

Signed and Sealed this
Third Day of September, 2019

Andrei Iancu
*Director of the United States Patent and Trademark Office*